United States Patent [19]

Dragani et al.

[11] 4,116,560
[45] Sep. 26, 1978

[54] APPARATUS AND METHOD FOR DOCUMENT MICROFILMING SYSTEM

[75] Inventors: James J. Dragani, Columbus; David S. Wise, Solon, both of Ohio

[73] Assignee: James J. Dragani, Columbus, Ohio

[21] Appl. No.: 804,011

[22] Filed: Jun. 6, 1977

[51] Int. Cl.$^2$ .................. G03B 27/52; G03B 27/32
[52] U.S. Cl. .................................. 355/41; 355/64; 355/77
[58] Field of Search ................... 355/39–43, 355/50, 64, 65, 77, 51

[56] References Cited

U.S. PATENT DOCUMENTS

| | | | |
|---|---|---|---|
| 3,645,619 | 2/1972 | Burton et al. | 355/64 X |
| 3,750,553 | 8/1973 | Pfeifer et al. | 355/40 X |
| 3,853,399 | 12/1974 | Walsh | 355/64 |
| 3,922,084 | 11/1975 | Burton et al. | 355/41 |

*Primary Examiner*—L. T. Hix
*Assistant Examiner*—W. J. Brady
*Attorney, Agent, or Firm*—Mahoney & Stebens

[57] ABSTRACT

A document microfilming system for information retrieval is provided having photographic apparatus for recording of series of documents on microfilm and identifier indicia printing means for applying an identifying number to the documents or sets of documents. The photographic apparatus comprises means auxiliary to that forming images of the documents on the film strip for forming a designator image on the film strip in adjacent, proximate relationship to images of selected documents. The identifier indicia imprinting means applies an identifying number to each primary document and also applies the same number to all sub-documents associated with that primary document. The control circuit systems include photodetector sensing devices that are designed to detect the presence of identified primary documents for control and operation of the photographic apparatus and identifier imprinting means to cause forming of a designator image on the film strip adjacent the image of a primary document and to increment the numerical printing device to the next sequential number upon detection of the entry of a primary document to the microfilming system apparatus. The primary documents utilized in this system are provided with indicia which differentiates the primary documents from all sub-documents in a set of documents forming a complete supply of information pertaining to a particular subject and facilitates subsequent retrieval of that information through minimizing of the indicators and designator images on the film strips.

31 Claims, 8 Drawing Figures

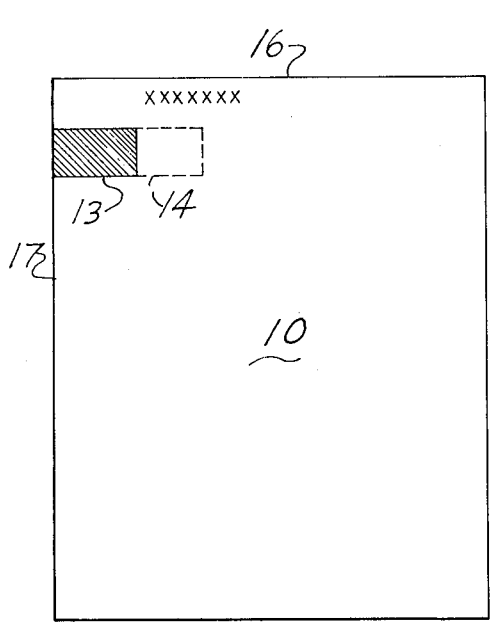
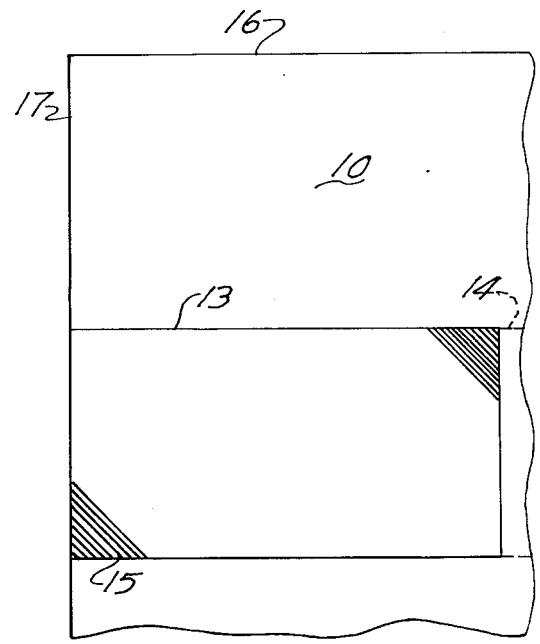
Fig. 2
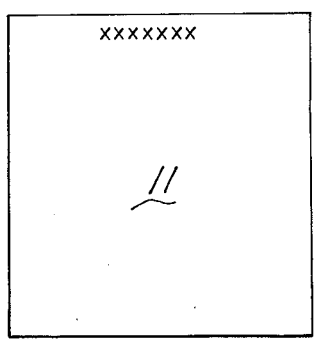
Fig. 1
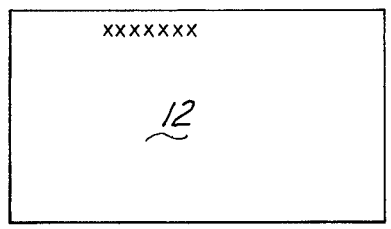
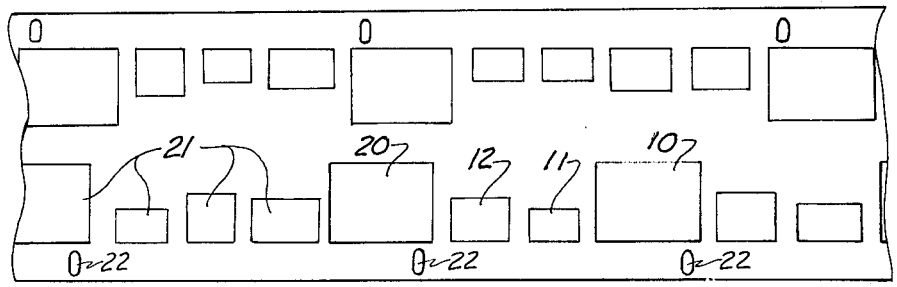
Fig. 3

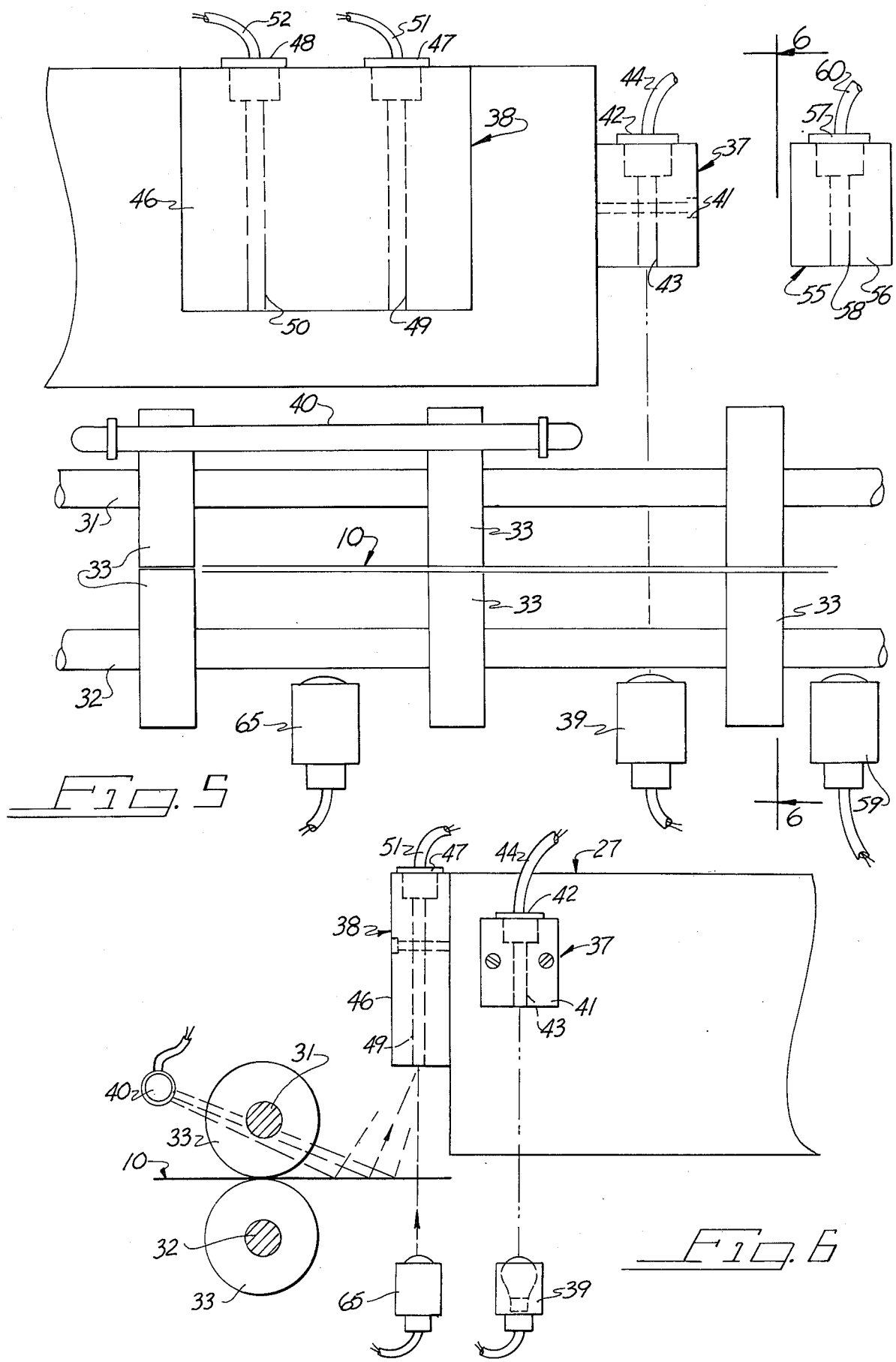

APPARATUS AND METHOD FOR DOCUMENT MICROFILMING SYSTEM

BACKGROUND OF THE INVENTION

The microfilming system of this invention is directed in a specific application to the insurance claims processing field and particularly to the medical insurance claims processing. In this particular field, an extremely large number of claim forms are received daily requiring processing to assure prompt and correct payment in accordance with the statutory and contractual terms of such insurance arrangements. Each of the claims that is received requesting payment for services and all prescribed drugs and products in generally accompanied by one or more supporting documents such as the individual service vendors invoices.

The basic claim form is designated a primary document with all supporting invoices then designated as sub-documents in the context of this invention. These primary and sub-documents for each claim thus form a set of documents which must be concurrently processed and maintained in the files for information retrieval systems of the insurance servicing company. Generally, all hard copies of the primary and sub-documents must be retained in a readily identifiable file and stored for subsequent utilization in verification of information that is otherwise transferred into information systems that include computer systems to facilitate and expedite processing as well as further servicing of any particular claim.

To facilitate the informational retrieval at subsequent times for further review and processing of any particular claim, the documents are preferably stored on photographic film which can be identified by claim numbers assigned to specific claims at the time of initial processing. Microfilm storage devices currently available for such purposes utilize a system wherein the images of the document thus photographed are also identified for purposes of machine location through the application and formation of additional images adjacent one or more selected documents images with these additional images being designated as clock-marks or blips. The microfilm viewers, generally a cartridge or cassette type, include mechanisms which are capable of recognizing the blip or clock-marks and automatically function to transport the film to a viewing position for a specific identified document. These documents, or their images, are located on respective frames of a film strip and are accordingly identifiable in numerical sequence on a strip of film. The apparatus utilized in such systems are of a relatively cumbersome nature requiring the addition of the designator blips or clock-marks at many frames which may not necessarily be the specific identified frame for a primary document of a set of documents. Such systems therefor result in a time consuming process in the location of a specific document at a later time where review of the documents is necessary for further processing of a claim. Additionally, it is particularly desirable that the hard copies of the documents as received in the processing facility be identified numerically for subsequent retrieval in the event verification of information originally transferred into the electronic data processing equipment, including that of the computers and microfilming apparatus, indicates error or becomes damaged or affected to the extent that the necessary information cannot be retrieved from such systems. It is for that reason that the original hard copy documents must be retained in files and stored for such use even though the event and requirement is minimal and considered primarily only a possibility. Consequently, it is important that these documents each be provided with an identifying number that is associated with a specific claim.

SUMMARY OF THE INVENTION

In the microfilming system of this invention, the documents to be processed are received in sets with each set being associated with a specific claim. Included in each set of documents is a primary document representing the basic claim form. Associated with that document may be one or more supporting invoices substantiating the amounts that appear on the claim form for medical services and providing of related medicines and other services including that of hospitals or medical facilities as well as the prescribed medications that may be included and necessary for the listed services. In accordance with the invention, the primary document or main claim is advantageously provided with appropriate marking indicia to which the apparatus of this invention is responsive and thus controls actuation of the various operations in the imprinting of sequentially incremented numerical identifiers and the specific identification of a basic claim image on strips of microfilm. A problem associated with the basic claim forms is that the medical insurance claims contain a substantial amount of preprinted information and format indicators which make it difficult to identify by machine apparatus and indicate the basic claim form documents from additional or auxiliary supporting sub-documents. In the system of this invention, each of the basic claim forms is provided with a unique and specific indicia that readily illustrates machine identification for control of the filming and number printing operations. This specific indicia comprises the formation of an area of specific dimensions and particular location on the document relative to edges thereof which minimizes erroneous indications of photodetection devices in identifying the desired basic claim form. The apparatus of this invention includes control systems of electronic type including photodetection devices that are responsive to relative differences in radiation transmission with respect to either the surfaces of the document or the edge portions. Accordingly, in a preferred embodiment, each of the basic claim forms is preprinted in a specifically designated area with a substantially opaque material having a coefficient of reflectivity which is readily distinguishable with respect to any adjacent portions of documents that are normally utilized in such systems. It is the identification and recognition of that specific area imprint in combination with detection of leading edges of the documents that provides the basic control functions for effecting the desired operation of the photographic and identifier imprinting mechanisms.

In accordance with the method of this invention, the hard copies of the original documents submitted for processing of any specific claim are subjected to the steps of printing and identifying a specific number to each basic claim form and its associated sub-documents and subsequently photographing these documents on strips of film. Included in the apparatus is suitable transport means for movement of the documents in serially spaced, sequential relationship through the number printing apparatus and the photographic apparatus. The approach and movement of the documents is sensed by photodetector devices which respond to the leading edge of all documents and are uniquely operable to sense the distinction between the basic claim forms carrying the described identifying indicia and all of the documents which do not contain or include such indicia. The control systems receive the inputs from the photodetection devices and function to control operation of the number printing device to sequentially increment the printer to the next successive number upon approach of a primary document in a set of documents. In combination therewith, the photodetection devices sense the existance of a particular document as a primary document and also controls the photographic apparatus for forming of the designator image or blip on the strip of film in adjacent relationship to the image that is formed on the primary document. In this invention, the basic claim forms or primary documents are designed to perform basic control input or provide the basic control input to the control system for operation of the apparatus in applying the identifier numbers to the claims and the formation of the film strip designator image. In addition to the advantageous indication and identification of the primary documents for performance of the control function, the apparatus is operable to also print the same identifier number on each of the sub-documents related to a primary document that is thus sensed.

The specific apparatus of the illustrated embodiment is advantageously designed to respond to radiation within the normal visible spectrum, thus eliminating the attendant complex circuitry and mechanisms otherwise necessary for the detection and identification of the primary documents. The photodetection devices are positioned to respond to the respective indicia such as either the leading edge of a document or the printed indicia on a primary document through either transmission of visible illumination in a direct path past the leading edge of the document or by reflective transmission with respect to the surface of the document. This arrangement permits the photodetectors to be easily positioned in preceding relationship to the operating components of the microfilming apparatus at the input station or document feeding section of such apparatus. The electronic control system and circuitry includes components which prevent operation of the controlled elements except upon receipt of electrical signals produced by the respective photodetection devices responding to the leading edge of the documents and the indicia carried by the primary documents. These and other objects and advantages of this invention will be readily apparent from the following detailed description of an illustrative embodiment and the accompanying drawings.

DESCRIPTION OF THE DRAWING FIGURES

FIG. 1 includes diagramatic plan views of a basic or primary claim document and associated sub-documents.

FIG. 2 is an enlarged plan view of the specific indicia area on a primary document.

FIG. 3 is a fragmentary plan view of a portion of a film strip carrying images of the documents thus photographed and the designator images.

FIG. 5 is a fragmentary vertical sectional view on a substantially enlarged scale taken along line 5—5 of FIG. 4.

FIG. 6 is a fragmentary vertical sectional view taken along line 6—6 of FIG. 5.

DESCRIPTION OF THE ILLUSTRATED EMBODIMENT

Figure 4:
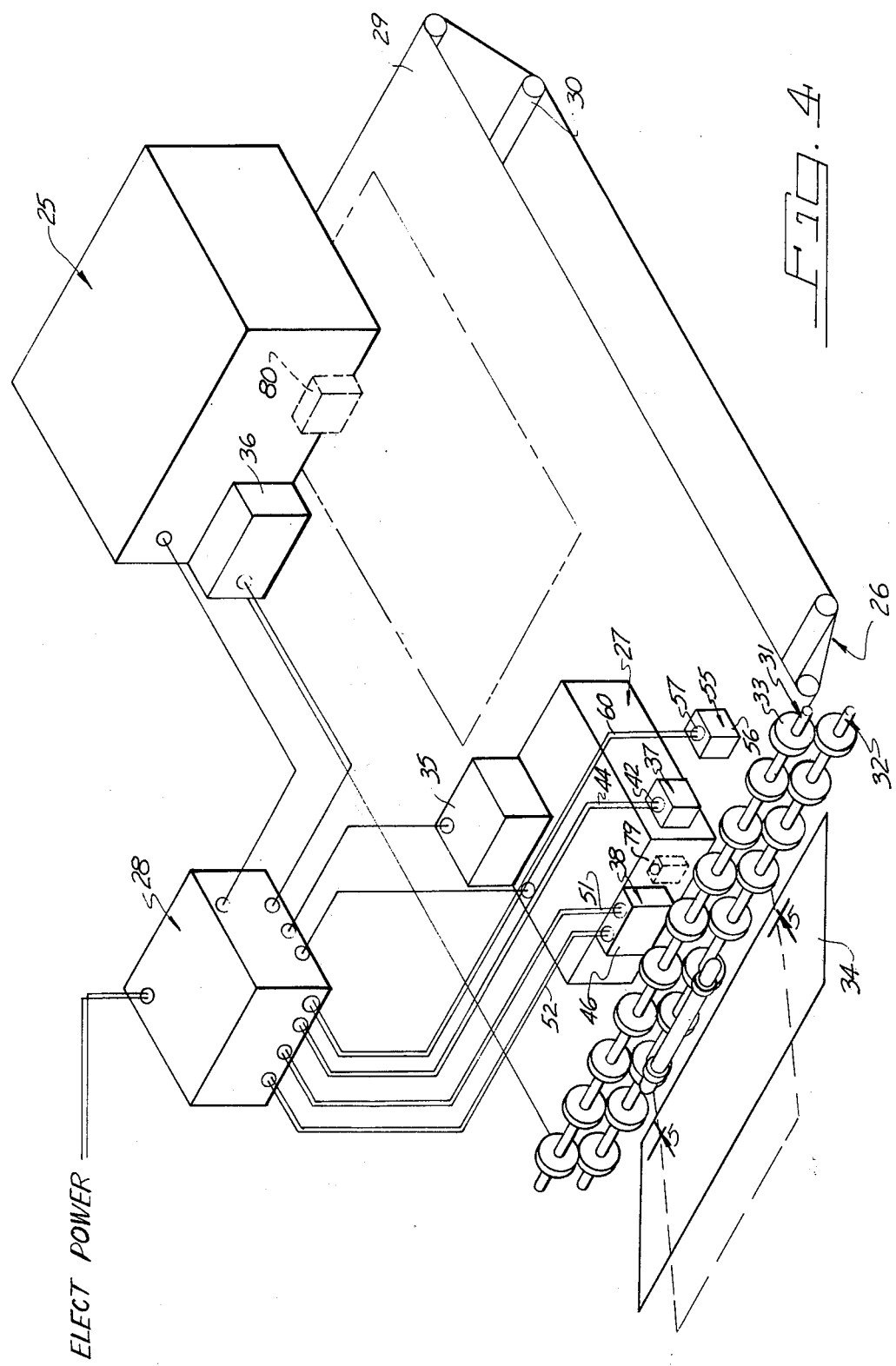
FIG. 4 is a diagramatic perspectic view of microfilming apparatus embodying this invention.

A document set with which this invention is particularly concerned is illustrated in FIG. 1 of the accompanying drawings. These document sets are illustrated in diagramatic plan form in serial and longitudinally aligned relationship to each other. It is in this arrangement that the documents are fed into and transported through the photographing and number printing apparatus. It will be understood that these documents, when received, would normally be in a piled or stacked relationship to each other. Generally, during the microfilming operations many sets of such documents in superimposed and stacked relationship are fed into the apparatus which incorporates in the document transporting mechanism, feeding apparatus which separates and serially feeds the documents from the top of any such stack and thus routes the documents through the apparatus and then deposits them at receiving station where they are again accummulated in stacked form.

Referring to FIG. 1, it will be noted that three documents are illustrated in this illustrative set of documents. Included in this set of documents is a basic claim form or primary document 10 and two associated or supporting sub-documents 11 and 12. In a particular system the primary document 10 will generally be of a standard predetermined size compatible with the particular information system and may be of the conventional letter page size of $8\frac{1}{2} \times 11$ inches long. The other sub-documents 11 and 12 that often are associated with the insurance claim forms in the medical fields are of varied sizes as illustrated by the documents 11 and 12. These documents are normally invoices or statements for the particular services and supplies that are itemized on the primary document 10. The specific size and arrangement of the forms as shown in FIG. 1 are for purposes of illustration and are not considered limitative on the utilization and application of this invention.

Referring specifically to the primary document as shown in FIG. 1, it will be seen that this document is provided with specific indicia 13 that is identified by the apparatus of this invention for purposes of detection of such primary documents. This specific indicia 13 is preferably originally printed on the document or claim form as a part of the printed format that indicates the information which must be supplied to the claim processor for effecting a payment of the particular subject. As can be best seen in FIG. 1, this specific indicia 13 comprises a particular surface area of the total claim form and is oriented in a designated relationship to a leading and one side edge of that document. As will be described hereinafter in further detail, the apparatus of the inventive system is designed to advantageously utilize photodetection devices and thus the specific indicia area 13 is designed to be compatible with such system and thus effect a controlled reflection of illumination which is incident to the surface of the document. For this purpose, the specific indicia area 13 as better seen in FIG. 2, comprises a rectangular block that is printed to have a predetermined degree of opacity and degree of reflectivity for the illumination that is utilized. It is the degree of reflection with respect to the specific indicia area 13 compared with the degree of reflection as to adjacent portions of the document, such as the portion indicated in broken lines as a substantially similar sized rectangular surface area 14, that provides the basis for detection of a primary document. To obtain this reflection comparison, area 13 is advantageously printed with a series of precisely controlled width lines 15 that are of a uniform color. This color is preferably a black or deep shaded gray for optimum contrast with adjacent surface portions of the form which is preferably of a relatively white having a substantially high degree of comparative radiation reflectively. The lines 15 may also be arranged and oriented in a diagonal relationship to the longitudinal axis of the paper which thus further facilitates distinguishing as between this particular indicia area 13 and other adjacent surfaces which may include substantial amounts of printed material. Exemplary of the relative dimensions of the specific indicia area 13, it will be noted that this area may have a length with respect to the longitudinal axis of the primary document of approximately one inch, with the width dimension being of the order of 1⅛ inches.

For further identification of the primary documents and distinguishing of this document from others, this specific indicia area 13 is preferably positioned in relatively spaced relationship to a leading edge of the primary document with that edge designated by the numeral 16. This distance is optimumly of the order of one inch and the indicia area 13 borders at its left hand edge on the left side edge 17 of the primary document.

For reasons which will be readily apparent in conjunction with the further description of the apparatus, the documents comprising each set are normally positioned for purposes of transport through the photographic equipment in serial alignment substantially as shown in FIG. 1. In this arrangement the documents are normally aligned along the left side edge as it is that edge which is associated with the identifying indicia 13 of the primary document. Consequently, with this arrangement, there will not be any error induced due to the lateral displacement of a relatively narrow width document such as 11 which would otherwise leave a vacant space along the left edge and thus perhaps adversely affect the detection devices so as to result in an error signal with respect to the document. While the spacing in a longitudinal direction of the several documents is shown as substantially uniform. It will be understood that this spacing is of little consequence and it is determined by the feeding mechanism itself of the apparatus. The operator has no control over the particular spacing between documents and only optimumly adjust stacks of documents so that left edges are aligned or justified.

One of the basic operations of the apparatus in the course of this invention is the imprinting of an identifying claim number on each document of a set of documents. In accordance with the method of this invention, the same claim number is printed on these documents forming a set with this number preferably being applied at a location near the leading edge of these documents. This is illustrated in FIG. 1 by the series of X's which are representative of a sequentially printed number which will be common to each of the documents in that particular set. It will be understood that the number of such numerals comprising an identifier number is determined by the specific processing facility and the number of X's are merely for purposes of illustration.

The second aspect or operation performed by the microfilming system is the forming of photographic images of the several documents and sub-documents on a strip of film. A resultant strip of film is diagrammatically illustrated in FIG. 3 and it will be noted that this film strip is of a dual track type with the series of documents being filmed on each of the two halves. In FIG. 3, the set of documents illustrated in FIG. 1 are indicated as having the images thereof formed on the film strip with the same documents indicated by the same numbers 10, 11 and 12. An additional set of documents is indicated in sequence and longitudinally aligned relationship and is seen to include a primary document 20 and at least four associated sub-documents 21. Also in accordance with this invention, a designator image is formed on the film strip in adjacent and close proximate relationship to each of the respective primary document images such as 10 and 20. This designator image indicated at 22 comprises a relatively small rectangularly shaped area which is of an opaque nature and effective in actuation of the retrieval viewing equipment for automatic location of a particular item on the film. As is well known, the microfilm viewing apparatus that is currently available includes mechanisms which are responsive to such designator images as 22 and, through counting systems are able to automatically index the strip of film to position the desired frame at a viewing station through numerical counters. This indexing can be coordinated with the specific claim number and thus greatly facilitates the location of a particular set of claim documents. The location of these documents in a set is further facilitated by the fact that the designator image is only associated with the primary document image and thus the operator will be immediately provided with a reproduction of that primary document. If additional information is required from the various sub-documents, then the film strip may be advanced to the sub-documents which will be on the film strip in following relationship for rapid assessability.

The basic structural components of an apparatus for effecting the objectives of photographically recording images of the documents as well as imprinting the documents with the identifying number is diagramatically illustrated in a perspective view in FIG. 4. These basic components comprise the photographic apparatus 25, a document transporting mechanism 26, identification number printing mechanism 27, and the electrical control circuits 28. These components and associated mechanisms are only diagramatically illustrated as they generally are included in microfilming equipment of this type. It will be understood however, that the specifics of the control circuit 28 will be modified and incorporate those circuits specific to effecting operation and control of the photographic apparatus and number printing mechanism 26 and 27 in accordance with the principles and concepts of this invention. It will also be understood that the various components illustrated in FIG. 4 would normally be located within a support and housing which would have only the basic control devices mounted for external manipulation as well as the infeed and collector stations for transport of the documents into and out of the apparatus. This housing is not illustrated in FIG. 4 as the arrangement and structural components thereof are well known and do not form a part of this invention.

Included in the illustrative document transport mechanism 26 is an elongated conveyor belt 29 having a generally horizontally extending upper run. This belt 29 is positioned on respective supporting and drive rollers 30 for revolution in the direction indicated by the arrows associated with the edge portions. Documents to be photographed and numbered are fed into the microfilming apparatus at a receiving end which is at the left end of the belt 29 and then moved horizontally towards the right where they are subsequently routed into a collecting or receiving station. Disposed immediately above the upper run of the belt 29 are the identification number printing mechanism 27 and the photographic apparatus 25. As illustrated, these components are positioned in longitudinally spaced relationship with the photographic apparatus positioned relatively downstream from the number printing mechanism.

Also included in the document transporting mechanism 26 is a document separating and feeding section comprising a pair of feed rollers 31 and 32. Each of the feed rollers includes a plurality of axially spaced discs 33 which are mounted in fixed relationship on respective shafts of each roller. The shafts of each roller include axially extending end portions adapted for mounting in support bearings and interconnection with a suitable electronic gear motor drive devices, the latter not being shown as they are well known and conventional with respect to such apparatus. A document feed table 34 may also be positioned in preceding relationship to the pair of feed rollers which are positioned in vertically aligned relationship and facilitates the infeed of the documents by the operator. This feed table preferably has an inner end edge that terminates closely adjacent the central tangential contacting area of the discs 33 and the documents can be readily fed by well known techniques to enable the documents to be separated and serially fed in sequential relationship and transported longitudinally through the apparatus along the top run of the belt 29.

The microfilming apparatus is designed for continuous running operation and thus the documents as they pass under the number printing mechanism 27 and photographic apparatus 25 will be moving relative to each component. The number printing mechanism 27 is of a well known structure and is designed for capability of imprinting a number on each document as it passes the printer and while the document is moving at a relatively rapid rate. Similarly the photographic apparatus 25 is designed to sequentially form an image on a film strip contained therein while the documents are moving at this same rate of speed. Also included in the number printing mechanism 27, is an increment control which is periodically actuated to cause the printing mechanism to increment to the next sequential number for printing of such numbers in sequence on the documents in accordance with the input control signals. This number increment control is indicated generally at 35 and mechanically coupled with the number printing mechanism. In the illustrative embodiment the number increment control 35 is actuated by an electrical control signal as is the photographic apparatus 25. The specifics of such actuating mechanisms are not otherwise illustrated and it will suffice for the purposes of explanation of this invention to indicate that these devices are actuated in response to receipt of an appropriate electrical control signal.

As previously indicated, the photographic apparatus 25, also incorporates mechanisms for forming of the designator image or blip 22 on the strip of film in association with the designated primary documents. This mechanism is illustrated as having a control that is generally illustrated in FIG. 4 at 36. This control includes internal circuitry and interconnection with the primary photographic apparatus 25 for effecting this control in the formation of the designator image on the film strip. Such circuitry and mechanisms are also of conventional construction and are not otherwise illustrated or described.

As previously indicated, the control system is dependent for its operation upon receipt of the electrical signals in accordance with the passage of a primary document into the microfilming apparatus. For this purpose, respective sensing means are provided for detection or sensing of the leading edge of a document as it enters the apparatus and also to respond to differences in reflection of illumination or radiation from the surface of the document as determined by passage of the indicia area 13 on the primary document. This detection and sensing is accomplished by means of respective photodetectors and associated radiation sources with the leading edge photodetector indicated at 37 and the indicia area sensor indicated at 38. Forming the source of radiation for each photodetector 37 and 38 are the respective electric lamps 39 and 40. Referring specifically to FIGS. 4, 5 and 6, it will be noted that the photodetector devices 37 and 38 are conveniently mounted on the number printing mechanism for support and proper relationship to the passage of the documents through the filming apparatus. It will also be noted that the relative lateral positioning of the two photodetectors is such that they will be normally oriented in proper longitudinal alignment relative to a transverse axis to assure that the documents will be correctly and properly sensed for control of the respective components of the apparatus.

In feeding the documents through the apparatus, it was indicated that the documents are normally aligned or justified along their left edges. With this alignment, these documents are then fed into the filming apparatus at a predetermined alignment with a left marginal edge path. This edge path is oriented with respect to the indicia area photodetector 38 so that this detector will pass over the respective indicia areas of any primary document. Also, since the documents are of various widths and it is necessary that the leading edge of each document be sensed, the leading edge photodetector 37 is positioned to be displaced slightly further to the right of this left path edge than the area photodetector 38. The positioning is such that it will detect the edge of even the most narrow document expected to be transported through the filming apparatus. It will also be understood that the specific arrangements and relative positioning of the detectors as to lateral relationship to a guide edge will be dependent upon the size and arrangement of the documents. For convenience of illustration, the photodetector 37 and 38 are shown mounted on the vertical side surfaces of the number printing mechanism 27, although other supports and structures may be provided for the proper positioning of these components. The area on which the number is printed is thus substantially aligned with the detection areas of these documents as they pass through the apparatus.

Specifics of the photodetectors 37 and 38 are better shown in FIGS. 5 and 6. The photodetector 37 as indicated is positioned on a longitudinal side wall of the number printing mechanism 27 and its associated radiation source or lamp 39 is supported vertically below that unit, and is provided with electrical conductors for interconnection with a suitable electrical power source. Forming the structure of the leading edge photodetector 37, is a mounting block 41 having a recess formed in its upper end for receipt of a photodetector element 42.

A vertical, relatively small diameter passage 43 extends from the bottom end of the mounting block 41 to permit entrance of radiation or illumination. This arrangement of a small diameter elongated passage 43 limits the possibility of extraneous illumination or radiation entering and effecting the operation of the element 42. Electrical conductors 44 attached to the photodetector element extend from the element 42 for interconnection with the control system.

Forming the structure of the indicia area photodetector 38 is a mounting block 46 which carries two photodetector elements 47 and 48. These two photodetector elements 47 and 48 are positioned in respective recesses formed in the upper end of the mounting block 46. Respective elongated and relatively small diameter passages 49 and 50 are also formed in the mounting block and extend downwardly from the base of the detector mounting recesses and open at the lower or bottom surface of the mounting block. Respective electrical conductors 51 and 52 connect with the detector elements 47 and 48 for interconnection of these elements into the control system.

Providing the source of radiation for operation of the two detectors 47 and 48 is the elongated electric lamp 40. This lamp is positioned in preceding relationship to the upper feed roller 31 and a distance above the plane through which the documents pass as they enter the filming apparatus. The specific structural mountings of the lamp 40 are not illustrated but it will be understood that appropriate brackets are provided for interconnection with the structural members of the filming apparatus. Electrical conductors 53 attached to the lamp 40 and its terminals are provided for interconnecting the lamp with a suitable source of electrical power.

Additionally, a third photodetector 55 is preferably incorporated into this system to provide a means of detecting documents of a specified width. This photodetector 55 is mounted on the apparatus at a position shown in the several figures to respond only to passage of documents having at least a minimum width which, in this illustrative embodiment, is about seven inches. The objective of this width detection is to eliminate the operation of the area detection with respect to documents of lessor width and thus aid in minimizing the possibility of error in system operation. This objective is achieved in that a great number of sub-documents in any set of documents will be of lessor width than the primary documents. Structurally, the width photodetector 55 includes a mounting block 56 having a photodetector element 57 disposed in a recess and an elongated passage 58 opening at the bottom of the mounting block. Supported below the plane of movement of the documents is an electric lamp 59 that provides a source of illumination for the detector 57. Electrical conductors 60 connect the photodetector element 57 into the control circuit 28.

With this arrangement of the photodetectors 47 and 48 and the source of radiation comprising the lamp 40, results in transmission of the radiation by means of reflection from a surface of the documents passing through and between the discs 33 of the feed rollers. The lamp 40 is of a length that exceeds the lateral length of the specific indicia area 13 and thus directs radiation across marginal edge portion of the documents that includes both the indicia area 13 of low reflectivity and adjacent area 14, indicated in broken lines in FIG. 1 with respect to the primary document 10. Consequently, a single source of radiation is incident to both such areas. The orientation of the passages 49 and 50 in the mounting block 46 and their respective lengths thus limit the radiation which ultimately affects the respective photodetectors 47 and 48 to a relatively small width band that is reflected from the surface of the document 10. The spacing of the passages 49 and 50 and associated detectors 47 and 48 is such that these detectors will be optimumly positioned immediately above the central area of both the area 13 and area 14 respectively. This specific arrangement and lateral positioning of the photodetectors 47 and 48 of the indicia area photodetector 38, thus enables these detectors to provide respective electrical signals that are appropriately responsive to the reflection from the areas which pass immediately beneath these two detectors. Operation of the two detectors will thus be seen to provide a difference in the electrical signals produced when a primary document passes beneath the detector 38.

To reduce the possible effect of extraneous light sources, or ambient light, on the area photodetector 38, the surfaces of the upper feed roller 31 in the vicinity of the detector are preferably treated to reduce the likelihood reflection from those surfaces. A suitable treatment is a black paint coating which is applied to surface of the discs 33 and roller shaft in the region of area photodetector.

Another source of illumination is preferably provided with respect to the photodetector element 48. This auxiliary source of illumination is an electric lamp 65 positioned vertically below the detector 48 and at an elevation so as to be beneath the plane of movement of the documents. The purpose of this lamp is to prevent an error signal that could be produced where a document is inadvertently displaced from the desired linear arrangement to a position where it may effect reflection of light to the one detector 47 but does not effect light reflection to the other detector 48. In this situation, the detector 48 will function as though it is sensing an indicia area 13 of low reflectivity and may cause the system to function as sensing a primary document, although erroneous.

Figure 7:
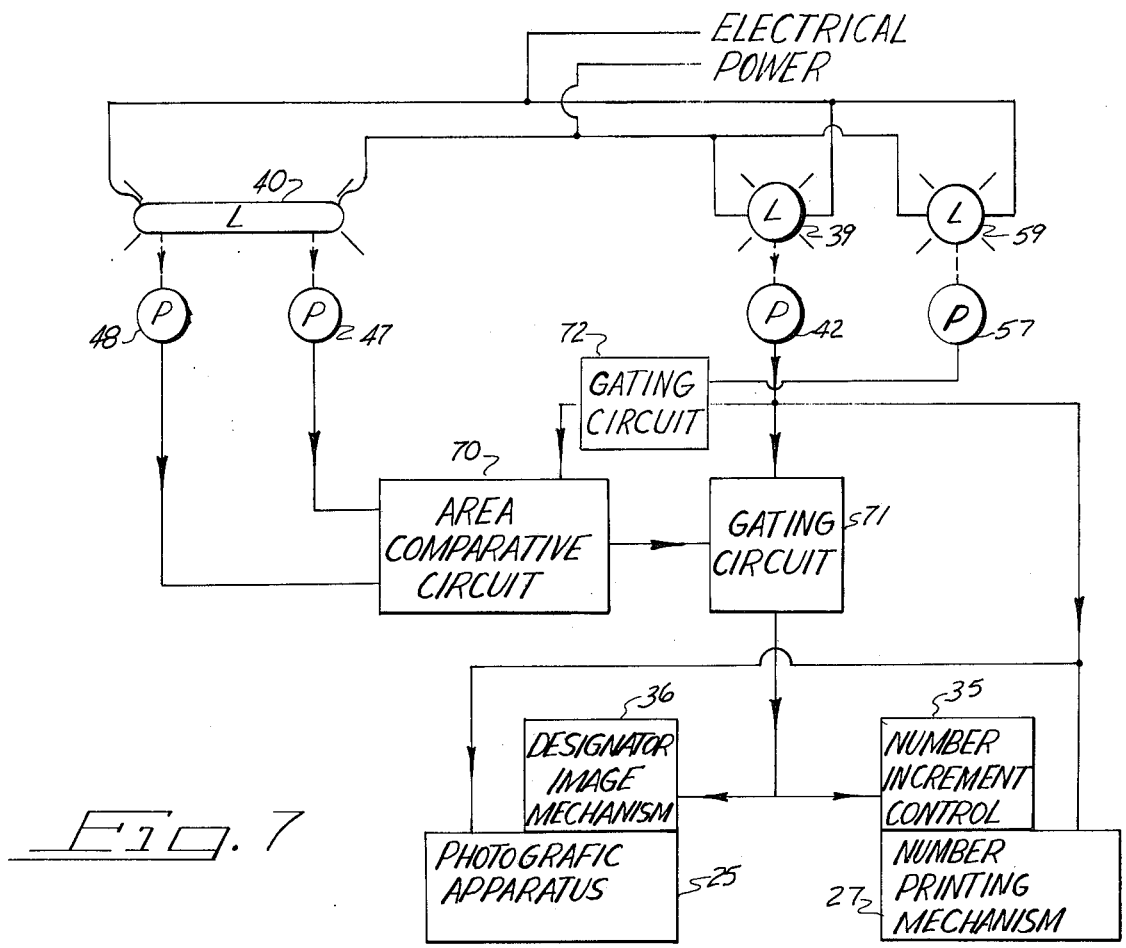
FIG. 7 is a schematic diagram of the control system.

The electrical circuitry for the control system is illustrated diagrammatically in FIG. 7. In that circuit, the various components are designated by a block diagram type circuit and is shown associated with the respective electric lamps 39, 40 and 59. These lamps are shown electrically connected to a suitable electrical power source. Electrical signals produced by the respective photodetector elements 42, 47, 48 and 57 are routed to the respective circuit components identified as an area comparator circuit 70 and gating circuits 71 and 72. It will be noted that the edge photodetector element 42 provides an input electrical signal to the two gating circuits 71 and 72 as well as to the number printing mechanism 27 and the photographic apparatus 25 while the width photodetector 57 only provides an input to the one gating circuit 72. The gating circuit 71 is designed to provide an output if it receives an input both from the edge photodetector 42 and the area comparator circuit 70. The output from this gating circuit is then applied to both the number increment control 35 and the designator image mechanism 36 for actuation of those two components. Specifically, a signal applied to the number increment control 35 results in incremating the number printing mechanism to the next sequential number, while the designator image mechanism 36 is operative then to apply the designator image to the film strip. The gating circuit 72 is designed to provide an output to the area comparator 70 when it receives an input from both the edge and width photodetectors 42 and 57 to thus enable the area comparator.

The area comparator circuit 70 in this system is designed to receive the input from the respective photodetector elements 47 and 48. This comparator circuit then analyzes these electrical inputs and will provide an output signal to the gating circuit 71 whenever there is a difference such as will result when a primary document 10 passes beneath the indicia area photodetector device 38 and the indicia area 13 affects the transmission of radiation to the photodectector 48. In this system, it will also be noted, as previously indicated, that an input is also required from the edge and width photodetector elements 42 and 57 in response to the passage of the leading edge prior to permitting operation of the area comparator circuit 70. This input signal must be received to indicate that a document is passing or entering into the apparatus before enabling operation of the area comparator circuit 70 to further assure that erroneous signals and controls will not be effected.

The system and apparatus described heretofore in detail with respect to FIGS. 1 through 7 will be seen to readily accomplish the desired and necessary functions of properly detecting and sensing a primary document included in a set of documents to be microfilmed. The apparatus, and its several photodetector units 37, 38 and 55, cooperate to minimize the likelihood or probability of error signals being introduced and effect an error operation of either the printing mechanism or the photo image producing device which would otherwise result in a subsequent error in attempting to relocate a specific claim. Utilization of a detection system which requires response as to three specifically distinct factors, has been found to provide the essential reliability for the operation of a microfilming system of this type. Requiring detection of the front edge in conjunction with detection for documents and the area indicia comparison, results in a unique system that is particularly efficient in its sensing of the primary documents as they traverse the apparatus. Detection of the front edge, or leading edge of the document, is appropriate as to all documents as they pass through the microfilming apparatus. This requirement is basic as it is necessary to cause the number printing mechanism and photographic apparatus to function at each instance of the document passing through the filming apparatus. It will be understood in conjunction with this description of operation that the photographic apparatus may be of various types and respond to specific signals other than as indicated. For example, the photographic apparatus could be operating at all times and it may be the absence of a signal that causes it to cease operation. Also, it will be recognized that the leading edge detection occurs at a point physically displaced with respect to the photographic mechanism and accordingly, appropriate circuitry to effect the proper delay would be incorporated to achieve the desired function. Similarly, the photographic apparatus would be responsive to the input signal for proper application of the designator image.

A primary factor contributing to the successful operation of the illustrative embodiment is the unique area comparator system utilizing the two photodetectors 47 and 48 responding to respective areas of differing reflectivity applied to only the primary documents. This area comparison for detection of a primary document also requires a concurrent signal from the leading edge detection to assure that the chance for introduction of error signal will be minimized. In accordance with this objective, the control circuits include circuitry which only enables the area comparator circuit 70 to function after the leading edge has either reached a predesignated point during its path of travel through the apparatus or has achieved a specific position in timed relationship to a point of passage for the leading edge of the specific indicia 13 and its adjacent area 14. Also, the circuitry advantageously incorporates timing circuitry that only permits the area comparator circuits 70 to function for a predetermined time interval which is functionally equivalent to the time required for passage of that specific indicia area 13 past this designated point. This limitation of the enabled time of operation for the area comparator circuit thus substantially reduces the chances and opportunities for the system to erroneously sense an error situation and produce an error signal for controlling the operation of increment control of either the number printing mechanism or designator image mechanism on the photographic apparatus. This particular aspect of operation is conveniently designated as a window concept in that there is only a predetermined time interval during which the apparatus is capable of sensing or detecting the presence of a primary document. This window concept thus eliminates the errors that can be otherwise introduced by sensing or detecting other documents as they pass through the apparatus. Restricting the operation of the detectors 47 and 48 to only that time after the leading edge has moved a distance of at least the one inch and then permitting this sensing of the responsive area for only a second distance of document travel of one inch, effectively minimizes the time during which the system can operate and possibly introduce an error signal to the system.

As previously indicated, the incorporation of a width detection in the system also provides a substantial reduction in the chance for introduction of an error signal. The width detection, as indicated, limits the operation of the system to only those documents which are the width that are nearly the same as the standard sized primary document to be utilized in a particular system. As indicated in the medical insurance application of such an apparatus, there are many subdocuments that are of a substantially smaller width. The width detection feature prevents the enabling of the area comparator circuit for documents of a width less than the predetermined minimum and thus prevents consideration of any such subdocuments by the area comparator circuit. Elimination of these relatively narrow subdocuments from consideration is thus seen to further reduce the chances of introducing an error signal.

A further possibility for introduction of an error through the detection system as illustrated and described, is a condition where a document is disposed at a skewed or angularly disposed position with respect to the longitudinal line of travel. In this situation, it is possible that the leading edge of the document will be positioned, as it passes through the apparatus in the area of the detectors, so that both the leading edge and width detectors 37 and 55 will sense the respective portions of a document but only the one area comparator detector 47 will respond to reflected radiation from the document. When the two detectors 37 and 55 sense an edge in such a manner, they will enable the area comparator circuit 70 at the proper time and it is possible that the documents may be angularly disposed relative to the path of travel so as not to underlie or effectively reflect radiation with respect to the photodetector 48 of the area comparator. When this situation occurs, the detector 48, if merely viewing an empty space condition, will operate in a manner indicating that it is looking at an opaque area or area of low radiation reflectivity. Consequently, the area detector 38 wll erroneously sense a primary document regardless of whether appropriate indicia areas 13 and 14 are present. This error is effectively eliminated through the addition of the auxiliary electric lamp 65 as previously indicated. Thus, when a document is not interposed in the vertical axis of the passage 50, the detector 48 will see the illumination from this lamp and operate on the basis that there is a substantial reflection of light similar to reflected radiation from documents (except from the indicia area 13) and thus not operate unless there is an actual document with the appropriate indicia area 13 present at the appropriate physical position.

The apparatus and system illustrated and specifically described heretofore is for a preferred arrangement of the components to obtain an optimum functional relationship. However, it will be understood that the invention may also be incorporated into existing equipment while retaining the specific advantages of the disclosed primary-document sensing concept. For example, the apparatus may be embodied in existing filming apparatus which has a number printing mechanism with associated increment control and a photographic apparatus that is also provided with a mechanism for applying the designator image. The circuitry for such a modified embodiment of the invention is essentially shown in FIG. 8. It will be seen in that figure that several components are the same as those illustrated and described in FIG. 7 with respect to the previously described embodiment. Specifically, those components include the leading edge detector 42, the area comparator circuit 70 and the one gating circuit 71. In this embodiment, the number printing mechanism is designated 75 and is provided with associated increment control 76. Also, in this embodiment, the photographic apparatus is designated by the numeral 77 and is provided with its associated designator image mechanism 78. This embodiment includes its own respective detecting devices 79 and 80 for operation of the number printing mechanism 75 and to actuate the designator image mechanism. These devices 79 and 80 which are indicated in FIG. 4 in broken lines mounted on the respective components, may also be photodetector devices which are positioned to sense and detect the leading edge of documents as they pass through the apparatus. From a functional standpoint, the detector device 79, upon sensing the presence of the leading edge of a document, will operate the printing mechanism to form a number on the document that then underlies the mechanism. In the conventional type systems, this detector 79 may then also apply a signal to the number increment control 76, to also actuate that device each time a document passes the detection station. Alternatively, the operation of the printing mechanism can be utilized in a mechanical manner to effect this increment control. However, for the purposes of this disclosure, it will suffice to note that the printing mechanism 75 does include increment control which is adopted to respond to an electrical signal input.

With respect to the photographic apparatus 77, this apparatus in conventional microfilming systems operates continuously during the time that the documents are being fed into the apparatus and functions in the manner of a motion picture camera. The detector 80 is utilized in such a system to directly apply a actuating signal to a designator image mechanism 78. This direct connection is not illustrated in FIG. 8 as the circuitry is modified to that extent. With that previous arrangement, the sensor 80 would thus detect the presence of the leading edge of a document that underlies the photographic apparatus and apply a designator image to the continuously moving film strip adjacent the location of each document image.

Figure 8:
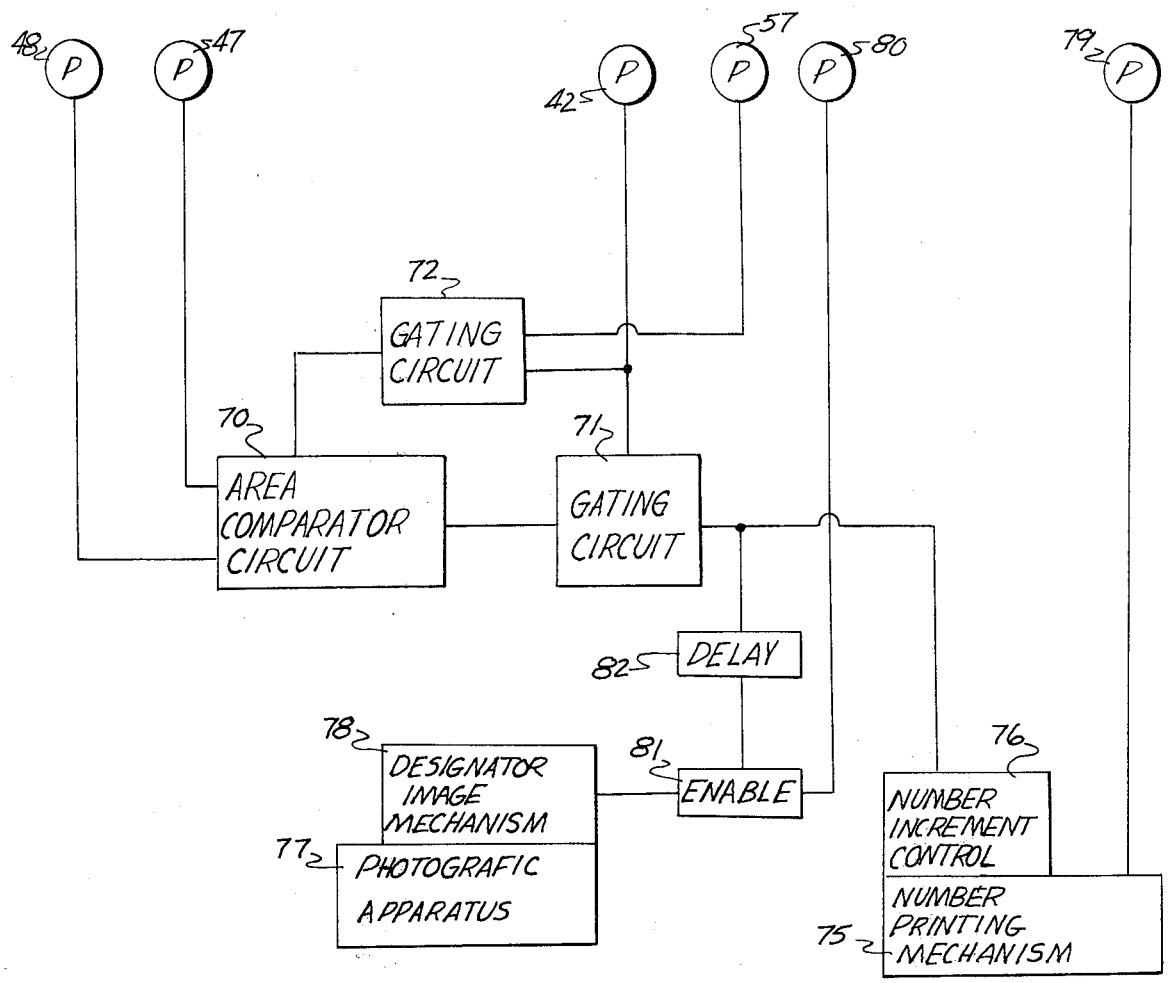
FIG. 8 is a schematic diagram of a modified control system.

In the modified system, as shown in the circuitry of FIG. 8, the previously described system is interconnected with the number increment control 76 and the designator image mechanism 78 to utilize the control signal as provided in accordance with the system and technique of this invention. Consequently, it will be seen that a signal is applied to the respective components 76 and 78 from the gating circuit 71 in the same manner as previously described in the circuit of FIG. 7. Consequently, a signal indicating that a primary document has entered the transport mechanism at the initial detection point, will be applied to the number increment control and increment the printing mechanism to the next sequential number. Simultaneously, a signal output from the gating circuit 71, will be applied to enable circuit 81, which is interposed in the electrical connection between the detector 80 and the designator image mechanism 36. The function of this enable circuit 81 is to prevent operation of the designator image mechanism 78 regardless of an application of a signal being provided by the detector 80 unless an appropriate signal has been first obtained from the area comparator signal circuit 70 through the gating circuit 71, indicating that a primary document is in the system. Since the photographic apparatus 77 is located relatively downstream from the number printing mechanism, as illustrated in FIG. 4, it is also necessary to introduce a delay in the operation of the signal to the enable circuit 81. Accordingly, a delay circuit 82 is shown interconnected between the gating circuit output and the enable circuit 81.

Accordingly, it will be seen that the advantages of the system previously described, will also be applicable to the embodiment of FIG. 8 with this embodiment functioning in substantially the same manner. The only difference in operation is that separate and distinct sensors, photodetectors 79 and 80, detect the leading edge of documents to provide respective and independent signals to the associated components. With respect to the number printing mechanism 75, a signal is provided for its actuation at each time the leading edge of a document passes its photodetector 79 while the added control elements provided by the invention produce a control signal for actuation of the increment control 76. The photographic apparatus 77 operates continuously in forming images of the continuously moving stream of documents with the added control elements provided by this invention preventing operation of the designator image mechanism 78 except when a primary document is detected.

Having thus described this invention, what is claimed is:

1. A microfilming system for information retrieval to photographically record sets of documents that include a primary document provided with specific indicia and associated subdocuments comprising (a) photographic apparatus for forming on a strip of photographic film an image of documents transported in serially spaced sequence past an imaging station, said photographic apparatus including means for forming an identifying designator image on said film strip in proximately disposed relationship to selected document images in response to receipt of a control signal, (b) document transport means engageable with the documents to be photographed and operable to serially convey the documents in longitudinally sequential relationship through said photographic apparatus, (c) identifier imprinting means disposed in operative relationship to said document transport means to imprint an identifier on each of the transported documents, said imprinting means including indexing means operable to increment said imprinting means to a next successive identifier in response to receipt of a control signal, and (d) control means including
  (1) first sensing means responsive to passage of a leading edge of a document past a first sensing station for generating a first electrical signal which is applied to said identifier imprinting means to effect actuation thereof and imprint the document with the identifier,
  (2) second sensing means responsive to the specific indicia carried by only primary documents of a set for generating a second electrical signal in response thereto, and
  (3) circuit means responsive to concurrent generation of first and a second elecrtrical signals with respect to a primary document to form a control signal operative to actuate said identifying designator image forming means and index said identifier imprinting means.

2. A microfilming system according to claim 1 wherein said first sensing means is positioned in predetermined preceding relationship to said identifier imprinting means and said photographic apparatus, said document transport means is operable to convey the documents at a predetemined velocity, and said control circuit means includes timing means operable to effect operation of said identifier imprinting means and said photographic apparatus when the document sensed is passing in operative relationship to each said means.

3. A microfilming system according to claim 2 wherein said first sensing means includes a photodetector.

4. A microfilming system according to claim 1 which includes primary documents having specific indicia with the specific indicia formed thereon in predetermined spaced relationship to a leading edge thereof, and wherein said second sensing means is positioned to sense said specific indicia subsequent to sensing of the leading edge by said first sensing means.

5. A microfilming system according to claim 4 wherein said second sensing means includes photodetector means.

6. A microfilming system according to claim 5 wherein said specific indicia comprises first and second surface areas differently affecting transmission of radiation with respect to said photodetector means, said photodetector means including first and second photodetectors responsive to only radiation affected by respective ones of said first and second surface areas.

7. A microfilming system according to claim 6 wherein said first and second surface areas of said specific indicia affect the amount of radiation transmitted through reflectivity.

8. A microfilm system according to claim 7 wherein said photodetector means includes a source of radiation disposed to reflect radiation from the document surface into each of said photodetectors, and said first and second surface areas of said specific indicia produce a difference in the amount of radiation that is reflected.

9. A microfilm system according to claim 8 wherein one of said surface areas has a coefficient of reflectivity substantially less than that of the other surface area.

10. A microfilming system according to claim 9 wherein the coefficient of reflectivity of the said one surface area is substantially less than that of any other surface area of the documents.

11. A microfilming system according to claim 6 wherein one of said surface areas has a coefficient of radiation transmissibility substantially less than that of the other surface area.

12. A microfilming system according to claim 11 wherein said first and second photodetectors are operative to provide respective signals in response to the difference in radiation transmission with respect to said two surface areas, said second sensing means including a comparator circuit receiving the signals from said photodetectors and generating said second electrical signal when the difference between said photodetector signals exceeds a predetermined value.

13. A microfilming system according to claim 12 wherein said first electrical signal generated by said first sensing means is applied to said comparator circuit to activate said comparator circuit only after the leading edge of a document has been sensed.

14. A microfilming system according to claim 13 wherein said control circuit means includes a gating circuit having first and second inputs connected to receive the respective signals from said first and second sensing means for generating the control signal upon concurrent receipt of both said first and second electrical signals.

15. A microfilming system according to claim 6 wherein said first and second photodetectors are mounted in support means disposed in spaced relationship to the plane of movement of the documents in preceding relationship to said identifier imprinting means and said photographic apparatus, and said photodetector means includes a source of radiation to which said photodetectors respond.

16. A microfilming system according to claim 15 wherein the specific indicia includes a surface area having a coefficient of radiation transmissibility substantially less than any other surface area of the document, said first and second photodetectors disposed in laterally spaced relationship to the path of movement of the documents with said first disposed in vertically aligned relationship to the path of the surface area of less radiation transmissibility.

17. A microfilming system according to claim 15 wherein said first and second photodetector support means includes a radiation shield limiting the radiation transmitted to the respective photodetector to a relatively small-angle conical projection.

18. A microfilming system according to claim 15 wherein each of said first and second photodetectors has a predetermined radiation responsive area and said support means includes an elongated passage for each photodetector having an exit end positioned in association with the radiation responsive area of the respective photodetector and an entrance end limiting the field of response of each photodetector to a relatively small angle conical projection.

19. A microfilming system according to claim 15 wherein said source of radiation is positioned in spaced relationship to the plane of movement of the documents at the same side of the document surface as said first and second photodetectors thereby resulting in reflection of radiation to said photodetectors.

20. A microfilming system according to claim 19 which includes a second source of radiation positioned in spaced relationship to one of said first and second photodetectors at an opposite side of a path of movement of the documents, said photodetector responsive to said second source of radiation in the same manner as the first mentioned source of radiation.

21. A microfilming system according to claim 20 wherein the specific indicia includes a surface area having a coefficient of radiation transmissibility substantially less than any other surface area of the document, said first and second photodetectors disposed in laterally spaced relationship to the path of movement of documents with said first photodetector disposed in vertically aligned relationship to the path of movement of the surface area of less radiation transmissibility and said first photodetector is responsive to said second source of radiation.

22. A microfilming system according to claim 1 wherein said first sensing means includes a photodetector and a source of radiation to which said photodetector responds, said photodetector and source of radiation are disposed in relatively spaced relationship at opposite sides of the plane of movement of a document transported through the microfilming system.

23. A microfilming system according to claim 1 wherein said control means includes third sensing means responsive to passage of a document past a second sensing station for generating a third electrical signal, said circuit means being responsive to only concurrent generation of said first, second and third electrical signals.

24. A microfilming system according to claim 23 wherein said control circuit includes a gating circuit having first and second inputs connected to receive the respective signals from said first and third sensing means for generating an enabling signal upon concurrent receipt of both said first and third electrical signals, said circuit means responsive to said enabling signal to form said control signal.

25. A microfilming system according to claim 23 wherein said third sensing means is operatively positioned for responding only to documents of at least a predetermined width.

26. The method of photographically recording sets of documents that include a primary document provided with specific indicia comprising the steps of
 (1) serially transporting the sets of documents with the primary document in leading relationship to any associated subdocuments of a set,
 (2) imprinting each primary document and the subdocuments of a set with the same identifying indicia by imprinting apparatus
 (3) photographically forming an image of each document on a strip of film subsequent to imprinting of the identifying indicia and selectively forming an identifier designator image on the strip of film
 (4) detecting the primary document of each set through sensing of the specific indicia to increment the imprinting apparatus to imprint a next successive identifying indicia and to form the identifier designator image in proximate relationship to the primary document image.

27. The method of claim 26 which includes sensing of the leading edge of documents transported through the apparatus.

28. The method of claim 27 which includes sensing of the width of documents transported through the apparatus.

29. The method of claim 28 in which the leading edge and width of the documents are concurrently sensed for enabling detection of a primary document.

30. The method of claim 29 in which detection of a primary document is only enabled for a predetermined interval of time relative to the length of the document and its rate of transport.

31. The method of claim 30 in which detection of a primary document is only enabled at a predetermined point subsequent to sensing of the leading edge of a document.

* * * * *